United States Patent [19]

Sakmann

[11] 4,193,703
[45] Mar. 18, 1980

[54] MATRIX PRINTER WITH PIEZOELECTRICALLY DRIVEN PRINTING NEEDLES

[75] Inventor: Walter Sakmann, Herrenberg, Fed. Rep. of Germany

[73] Assignee: International Business Machines Corporation, Armonk, N.Y.

[21] Appl. No.: 868,561

[22] Filed: Jan. 11, 1978

[30] Foreign Application Priority Data

Mar. 12, 1977 [DE] Fed. Rep. of Germany ....... 2710935

[51] Int. Cl.² .............................................. B41J 3/10
[52] U.S. Cl. ................................ 400/124; 101/93.05; 310/328
[58] Field of Search .................... 400/124; 101/93.05; 310/328

[56] References Cited

U.S. PATENT DOCUMENTS

| 3,447,455 | 6/1969 | Shneider | 101/93.48 |
| 3,473,466 | 10/1969 | Thayer | 310/328 X |
| 3,649,857 | 3/1972 | Knappe | 310/328 X |
| 3,970,184 | 7/1976 | Helmrich et al. | 310/328 X |

FOREIGN PATENT DOCUMENTS 535114  11/1976  U.S.S.R. .................................. 310/328

OTHER PUBLICATIONS

IBM Tech. Disc. Bulletin, W. Sakmann, vol. 20, No. 6, Nov. 1977, p. 2263.

Primary Examiner—Paul T. Sewell
Attorney, Agent, or Firm—Edward H. Duffield

[57] ABSTRACT

A matrix printer with piezoelectrically driven printing needles is described in which an electrically controlled piezocrystal arrangement transfers upon its expansion, its change of length to a buckling spring. Coupled to the buckling compression column spring is a printing needle which, upon the deflection of the buckling spring, is driven in the printing direction.

2 Claims, 7 Drawing Figures

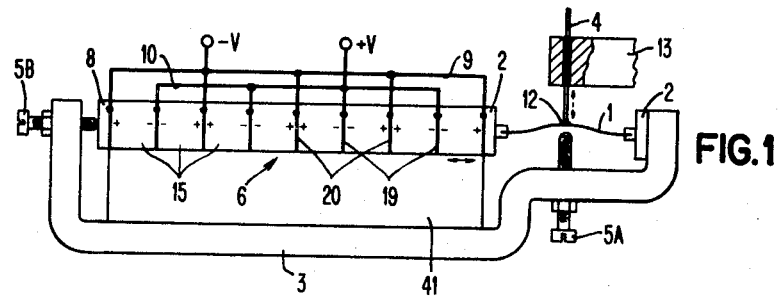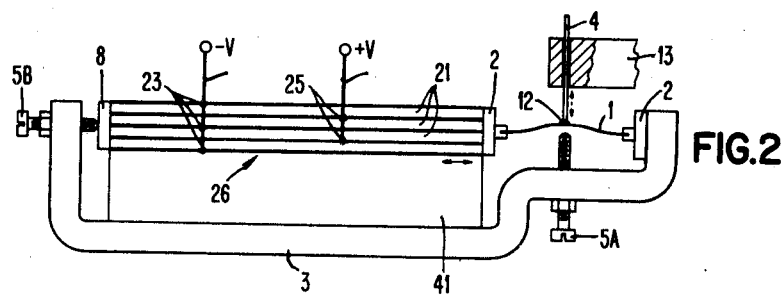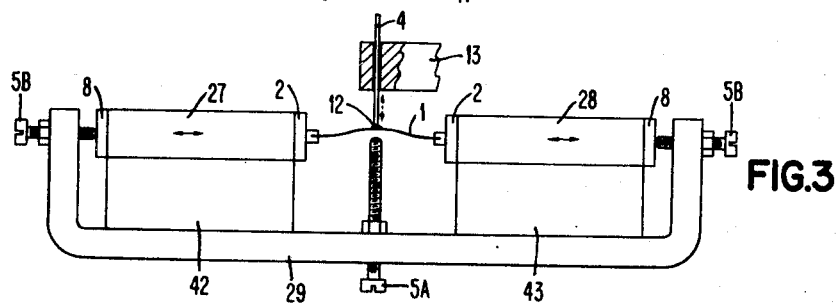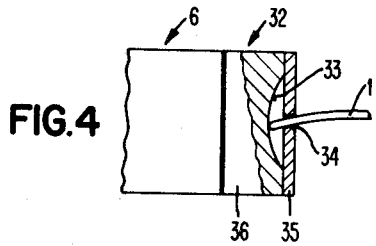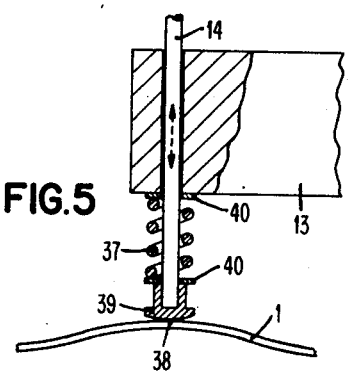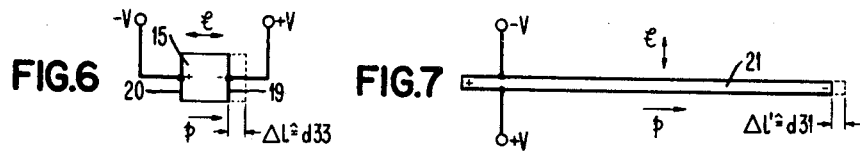

MATRIX PRINTER WITH PIEZOELECTRICALLY DRIVEN PRINTING NEEDLES

FIELD OF THE INVENTION

The invention relates to matrix printers in general and more specifically to piezoelectrically driven printing needles or wires for such printers.

PRIOR ART

A great amount of prior art exists for wire or needle matrix printers, and, from German Offenlegungsschrift 2 342 021, a mosaic printing head for typewriters is known where elongated piezoelectrical transducers are provided. On these transducers different electrical fields are applicable in rapid succession. The transducers respond to such fields and act on the spotproducing printing elements. In the arrangement described in this Offenlegungsschrift, however, a sufficient deflection of the printing element (for multiple forms, i.e., copies) by the piezocrystal is not possible. In an optimum mass adaptation the mass of the printing needle would have to correspond to the effective mass of the piezo crystal, i.e., the mass of the needle would have to be very high. This would, however, have the disadvantage that no high printing frequencies would be possible because the crystal expansion speed is less than 0.1 m per second—with acceptable crystal lengths being assumed.

OBJECTS OF THE INVENTION

It is, therefore, the object of the invention to provide an improved arrangement for a matrix printer with piezoelectrically driven printing needles which permits a high printing frequency and relatively great needle deflections.

BRIEF DESCRIPTION OF THE DRAWINGS

FIG. 1 is a schematic representation of the buckling spring stroke amplifier with a one-sided piezo crystal arrangement, where the individual piezo crystal elements are arranged electrically in parallel, and mechanically in series according to their expansion used.

FIG. 2 is a schematic representation of the buckling spring stroke amplifier with a one-sided piezo crystal arrangement, where the individual piezo crystals are arranged electrically in parallel, and mechanically in parallel according to their expansion used.

FIG. 3 is a schematic representation of the buckling spring stroke amplifier, with a two-sided piezo crystal arrangement.

FIG. 4 is a schematic representation of the buckling spring with self-aligning bearing.

FIG. 5 is a schematic representation of a printing needle impact-coupled to the buckling spring, with return spring.

FIG. 6 is a basic representation of a piezo crystal element with respect to its optimum expansion and excitation direction.

FIG. 7 is a basic representation of a piezo crystal element with expansion and excitation directions that are perpendicular to each other.

DETAILED SPECIFICATION

FIG. 1 shows a schematic representation of the buckling spring stroke amplifier with a one-sided piezo crystal arrangement. In it, the individual piezo crystal elements are arranged electrically in parallel and mechanically in series in accordance with their expansion used.

Upon respective excitation, which will be explained below in detail, the piezo crystal arrangement is expanded in a specific direction used (arrow direction towards the right). This movement acts on a buckling compression column spring 1 which, at its ends, is fixed in holding elements 2. One of these holding elements is provided on the head of the piezo crystal arrangement 6; the other one is fixed to a stationary immovable holding part 3. When piezo crystal arrangement 6 is excited, buckling spring 1 is exposed to a shock wave. This shock wave pushes spring 1 upwards in the arrow direction represented in a dashed line. A printing needle 4 is firmly coupled to point 12 on buckling spring 1. When buckling spring 1 is deflected upwards in the arrow direction, printing needle 4 is also moved in that direction. Printing needle 4 extends through guide 13 as shown.

When buckling spring 1 is deflected, the printing needle 4 is deflected in printing direction as just explained. For a multiple paper printing (several carbons) a minimum stroke of the printing needle of approximately 0.3 to 0.4 mm is required.

In conventional matrix printers with electromagnetic needle drives, only up to 1000 cps approximately with such a respective stroke could be reached, due to the electromagnetic losses (leakage field, eddy current) in the required masses for building up the magnetic forces.

The arrangement according to the invention herein permits printing frequencies which are far higher than this above limit, i.e., up to 2000 cps approximately. Besides, the losses involved (friction losses and losses in the piezo crystal arrangement) are so low that for the operation of the matrix printer they are negligible.

The electromechanical level of efficiency is much higher than in the above mentioned matrix printers with electromagnetic needle drives. In a relatively small length alteration of the piezo crystal arrangement, e.g., in the order of 10 to 15 $\mu$m, said alteration is amplified, by means of the buckling spring principle of the stroke amplifier, into a multiple, vertical deflection (shown in dashed arrow direction) upward to 0.4 mm. With this deflection, the printing needle 4 is activated for the printing process. For a deflection of buckling spring 1 in a pre-defined direction (dashed arrow line upward) a preloading of the spring in this direction is required. For that purpose, buckling compression spring 1, by means of adjustment screw 5A fixed in holding part 3, is placed into a position which is slightly curved upward (in printing direction). For achieving a high printing frequency a still higher intrinsic frequency of printing spring 1 is absolutely necessary. Such a high intrinsic frequency is ensured by a small printing spring mass. In order to ensure, with a small mass, the operation of the buckling spring in the elastic range, the spring requires a high relative stiffness for the high forces involved (relative stiffness = E-modulus/specific density). A buckling spring of high relative stiffness can be made either by (a) a lamellated structure, or (b) by fibre materials bonded with suitable adhesive for synthetics.

With fiber materials, as e.g. boron and carbon fibers, relative stiffnesses can be reached which are higher by a factor 3 to 5 than with steel, which corresponds to the demands for the printing process to be executed. Such fiber materials have been developed in other fields (turbine manufacture, aircraft manufacture) specifically for high relative stiffness ratio, and they have been employed with success.

Buckling compression column (hereinafter called spring 1 for brevity) spring 1 is designed as a leaf spring. In this manner it is made sure that it has only one defined buckling direction (dashed arrow direction), and that in the other direction perpendicular thereto it remains stable (no deflections). In order to permit a high packing density, a narrow spring is also desirable; however, this requires an additional guide. Holding elements 2 receiving buckling spring 1 are designed in such a manner that the spring shows only minor signs of wear (e.g. through so-called friction rust). For that reason, the spring ends are glued into a recess adapted to the cross-section of the spring. Due to the pre-loading of the buckling spring by means of the adjustment screw 5A, the individual piezo crystal elements of piezo crystal arrangement 6 are pre-loaded, too. This is necessary because piezo ceramics, although being resistent to high pressure loads, are not resistent to high tensile stresses. Through a pressure pre-load the piezo crystal can be made to oscillate in the so-called "pressure range" only. The setting of the pre-load for piezo crystal arrangement 6 is to be performed in the pressure range according to this requirement. Piezo crystal arrangement 6 is supported on the insulator which is connected to holding part 3.

Designing the Piezo Crystal Arrangement

FIG. 6 shows a conventional, commercially available piezo crystal element 15 (e.g. lead-titanate-zirconate, or barium titanate). Such a piezo crystal element 15 is characterized by two pole faces (19 and 20). When a corresponding control voltage is applied ($-V$ to the +pole face 20; $+V$ to the $-$pole face 19. The symbols + and − refer in that connection only to polarization vector $p$) the polarization direction $p$ is identical with the electrical field direction $\epsilon$ or opposite thereto, respectively, and the piezo crystal element is altered with respect to its length in the direction of the electrical field (length alteration $\Delta 1 \triangleq$ load constant $d_{33}$.

If the polarization direction $p$ and the electrical field $\epsilon$ are perpendicular to each other (FIG. 7) piezo crystal element 21 is subjected to a smaller length alteration $\Delta 1' \triangleq d_{31}$) in the direction of polarization $p$. Taking into consideration these two possibilities there exist two solutions for coupling such piezo crystal elements to each other. The piezo crystal elements may be of very coarse or very fine lamellation. The term lamellation means that individual piezo crystal elements are arranged in series with alternating electrical field direction. Each element continues to have its two pole faces. The pole faces of the individual elements are interconnected in accordance with FIG. 1 and FIG. 2.

A coarse lamellation demands a correspondingly high operating voltage (more than 1000 volts) with the consequence of a low controllability of these piezo crystal elements by the respective semiconductor circuits. Another consequence of coarse lamellation, due to the relatively high distance between the pole faces, is a low capacity and therefore only low control currents, too. For a finer lamellation, only low operation voltages smaller than 1000 volts are required, but analogously to the above mentioned case there are higher capacities and higher control currents.

A lamellation of discretionary fineness is, however, not recommended for reasons of an acoustic resistance increasing with said fineness. Due to the shock wave moving from piezo crystal element to piezo crystal element there appear at the interfaces of adjacent piezo crystal elements power losses in expansion direction.

In FIG. 1, the individual piezo crystal elements 15 are arranged electrically in parallel and mechanically in series with respect to their expansion used. The polarities plus and minus given in the representation according to FIG. 1 in the individual piezo crystal elements refer to the polarization direction. The piezo crystal elements are arranged in series in such a manner tht the respective pole faces of the same polarization polarity are fronting each other. The entire piezo crystal arrangement should always comprise an even number of piezo crystal elements. All pole faces 19 which are associated to a negative polarization polarity are connected via lines 10 to the positive pole $+V$ of a voltage source from which the electrical field for the individual piezo crystal elements 15 is derived; all pole faces 20 for the positive polarization polarity are connected to the negative pole $-V$ of this voltage source via lines 9. If piezo crystal arrangement 6 consists of an even number of piezo crystal elements 15, and with external pole faces for the positive polarization polarity which are connected to the negative pole $-V$ of the voltage source, the arrangement-internal connections for the positive pole of the voltage source are screened (by the ground connection potential of this voltage source).

When a control voltage is applied the expansions used for the individual piezo crystal elements 15 add up in the solid arrow direction. An additional pre-load screw 5B guided in the immovable fixed holding part 13 acts via the intermediate unit onto that end of piezo crystal arrangement 6 which is opposite to buckling spring 1, and generates an additional pre-load.

FIG. 2 shows a schematic representation of the buckling spring stroke amplifier with a one-sided piezo crystal arrangement, where the individual piezo crystal elements are arranged electrically parallel and mechanically parallel with respect to their expansion used. The operation of this arrangement is analogous to that of FIG. 1. The only differences exist in the shown arrangement of the individual piezo crystal elements. The lamellation is not provided horizontally as in FIG. 1, but vertically. Polarization direction and direction of the electrical field applied are perpendicular to each other. In that arrangement, with higher electrical field intensities, smaller expansions can be achieved in the individual piezo crystal elements than in the case of FIG. 1. The field intensity in the crystal element should generally not exceed 500 volts per mm as otherwise there would be a depolarization. The individual piezo crystal elements are marked 21; the pole faces connected via conductor 22 to the negative pole $-V$ of the voltage source are marked 23; the pole faces connected via conductor 24 and the positive pole $+V$ of the voltage source, are marked 25. The entire piezo crystal arrangement has been given the reference number 26. All other reference numbers correspond to those of FIG. 1.

FIG. 3 shows a schematic representation of the buckling spring stroke amplifier with a two-sided piezo crystal arrangement. There, the two parts 27 and 28 of the piezo crystal arrangement are provided on both sides of buckling spring 1, and supported on insulator elements 42 or 43. At the end away from the buckling spring these two parts 27, 28 are provided at a fixed immovable holding part or at a pre-loading screw 5B guided in this holding part so that upon an excitation they can expand only in the direction of the buckling spring. In that representation the arrangement of the individual piezo crystal elements within piezo crystal arrangement 27, 28 is not considered. It is evident that the individual piezo crystal elements can be arranged both electrically and mechanically in parallel with respect to their expansion used, as described in connection with FIG. 2, or that they can also be arranged electrically in parallel and mechanically in series in accordance with their expansion used, as described in connection with FIG. 1. A piezo crystal arrangement in divided form on both sides of buckling spring 1, as shown in FIG. 3, offers specific advantages. On the one hand, less individual mass is required per piezo excitation unit 27, 28 which is more advantageous from a pulse point of view, on the other hand the lateral buckling losses in the piezo crystal elements are lower, and furthermore shock waves move in both directions. This permits a clearer deflection situation, with the extension due to the shock waves having to be considered. The application of printing needle 4 to the buckling spring 1, the guiding of the printing needle, and the existence of an adjustment screw 5A corresponds to the statements made in connection with FIG. 1.

FIG. 4 shows a schematic representation of buckling spring 1 with self-aligning bearing in a sectional part view. The end of buckling spring 1 is not firmly connected there to a holding device but moves freely within a cup 33 of a part 36. Buckling spring 1 is freely inserted in an opening 34 of a cover 35. Self-aligning bearing 32 is connected to piezo crystal arrangement 6 or 26 or to holding part 3.

FIG. 5 shows a schematic representation of a printing needle 4 shock-coupled to buckling spring 1, with a return spring 37. At point 38 of buckling spring 1 a receiver part 39 for printing needle 14 is provided. Printing needle 14 is firmly connected to this receiver part 39. Printing needle 14 also extends through guide 13. Between the lower edge of this guide element 13 and receiver part 39 which is flattened out at its lower end a compression spring 37 is provided between two discs 40. Upon the operation of buckling spring 1 and deflection of printing needle 14 in printing direction a force acts upward in arrow direction which overcomes the counterpressure of compression spring 37. After the printing process printing needle 14 is returned to its starting position by the force of compression spring 37.

Particular attention should be paid to the duration of the control pulses for the piezo electrical crystal arrangement. On principle, the duration of the control pulse is in the order of the oscillation time of the buckling spring. When the pulse duration is correspondingly adapted to the oscillation time of the buckling spring this offers the advantage that the oscillating piezo crystal attenuates the oscillation of the spring, i.e., the piezo crystal oscillates only as long as there is an electrical field. For this practically observed phonomenon, there does not yet exist a clear 100% theoretical explanation so that we can only refer to the practical observation according to which the pulse has an optimum duration to be determined empirically, with the buckling spring no longer oscillating after the pulse. If the pulse, in deviation from its optimum duration, is made too long or too short the buckling spring at any rate terminates its oscillation after having been excited. In order to avoid misunderstandings it should be pointed out that the piezo crystals are controlled by pulses.

Having thus described the invention with regard to several illustrative preferred embodiments thereof, departures and modifications in the designs still in accordance with the spirit and teachings will be apparent to those of skill in the art, therefore, what is claimed is:

1. In a matrix printer having piezoelectrically driven printing elements, the improvements comprising:
   a buckling compression column spring;
   at least one piezoelectric crystal arrangement provided with electrical contacts for electrical control of the expansion of said crystal arrangement;
   means for coupling the expansion of said crystal arrangement to said spring along the line of the axis of said spring to create a buckling thereof; and
   a movable printing element supported adjacent to the central portion of said spring to be deflected therewith when said spring buckles;
   said buckling spring being arranged between two piezoelectric crystal arrangements acting at opposite ends thereof.

2. Apparatus as described in claim 1, further including: compression means for preloading said piezoelectric crystal arrangements in compression.

* * * * *